(12) United States Patent
Jung

(10) Patent No.: US 12,107,840 B2
(45) Date of Patent: Oct. 1, 2024

(54) VEHICLE CONTROL APPARATUS AND CONTROL METHOD THEREOF

(71) Applicants: HYUNDAI MOTOR COMPANY, Seoul (KR); Kia Corporation, Seoul (KR)

(72) Inventor: Ho Jin Jung, Bucheon-si (KR)

(73) Assignees: HYUNDAI MOTOR COMPANY, Seoul (KR); KIA CORPORATION, Seout (KR)

( * ) Notice: Subject to any disclaimer, the term of this patent is extended or adjusted under 35 U.S.C. 154(b) by 206 days.

(21) Appl. No.: 17/833,168

(22) Filed: Jun. 6, 2022

(65) Prior Publication Data

US 2023/0030805 A1 Feb. 2, 2023

(30) Foreign Application Priority Data

Jul. 26, 2021 (KR) .................. 10-2021-0098052

(51) Int. Cl.
*H04L 9/40* (2022.01)
*G07C 5/00* (2006.01)
*H04L 9/08* (2006.01)

(52) U.S. Cl.
CPC .......... *H04L 63/0435* (2013.01); *G07C 5/008* (2013.01); *H04L 9/0825* (2013.01); *H04L 63/062* (2013.01); *H04L 2209/84* (2013.01)

(58) Field of Classification Search
CPC . H04L 63/0435; H04L 9/0825; H04L 63/062; H04L 2209/84; H04L 9/0841; H04L 9/0897; H04L 9/085; H04L 9/0877; H04L 9/0861; H04L 9/0894; H04L 63/061; H04L 63/045; H04L 9/14; H04L 67/12; H04L 63/06; H04L 63/064; H04L 9/0816; H04L 9/0819; G07C 5/008; G07C 2205/02; G07C 5/0808; G07C 5/00; B60W 50/02; B60W 2050/0005; H04W 4/40; H04W 4/42; H04W 4/44; H04W 4/46; H04W 4/48
See application file for complete search history.

(56) References Cited

U.S. PATENT DOCUMENTS

| 9,648,023 | B2 * | 5/2017 | Hoffman | ............. | H04W 12/084 |
| 11,516,191 | B2 * | 11/2022 | Wang | .................... | H04L 9/3247 |
| 11,783,302 | B2 * | 10/2023 | Vanderveen | ..... | G06Q 10/06311 |
| | | | | | 705/305 |
| 2016/0012653 | A1 * | 1/2016 | Soroko | ................... | G07C 5/008 |
| | | | | | 340/5.61 |
| 2017/0093866 | A1 * | 3/2017 | Ben-Noon | .......... | H04W 12/068 |

(Continued)

FOREIGN PATENT DOCUMENTS

EP 3902012 A1 * 10/2021 ........... G05B 19/042

*Primary Examiner* — Techane Gergiso
(74) *Attorney, Agent, or Firm* — MORGAN, LEWIS & BOCKIUS LLP

(57) ABSTRACT

A vehicle control apparatus and a control method thereof are provided. A vehicle control apparatus includes a processor including a host core and a hardware security module (HSM) core. The processor generates a first private key and a first public key, receives a second public key from a diagnostic device, generates a shared key based on the first private key and the second public key, receives a security data transmission request from the diagnostic device, and encodes data based on the shared key and transmits the encoded data to the diagnostic device.

20 Claims, 10 Drawing Sheets

(56) References Cited

U.S. PATENT DOCUMENTS

| | | | | |
|---|---|---|---|---|
| 2018/0229739 | A1* | 8/2018 | Imamoto | B60W 50/04 |
| 2018/0279119 | A1* | 9/2018 | Eftimovski | H04W 12/06 |
| 2021/0127268 | A1* | 4/2021 | Franyie Quintana | G07C 5/008 |
| 2021/0288801 | A1* | 9/2021 | Kulkarni | H04L 9/0631 |
| 2021/0367930 | A1* | 11/2021 | Wang | H04L 9/3271 |

* cited by examiner

VEHICLE CONTROL APPARATUS AND CONTROL METHOD THEREOF

CROSS-REFERENCE TO RELATED APPLICATION

This application claims the benefit of priority to Korean Patent Application No. 10-2021-0098052, filed in the Korean Intellectual Property Office on Jul. 26, 2021, the entire contents of which are incorporated herein by reference.

TECHNICAL FIELD

The present disclosure relates to a vehicle control apparatus and a control method thereof, and more particularly, relates to technologies of securely communicating with a diagnostic device using a hardware security module (HSM).

BACKGROUND

A vehicle control apparatus may communicate with a diagnostic device through diagnostic communication such as controller area network (CAN) communication. The diagnostic device may request the vehicle control apparatus to transmit data. The vehicle control apparatus may transmit the data requested by the diagnostic device.

Meanwhile, when transmitting the data to the diagnostic device, the vehicle control apparatus uses a unified diagnostic service (UDS) protocol designated as an international standard. The UDS protocol does not describe contents about security of a channel established for communication between the vehicle control apparatus and the diagnostic device. Thus, communication between the vehicle control apparatus and the diagnostic device may be vulnerable to security. For example, a hacker hacks a communication channel established between the vehicle control apparatus and the diagnostic device to steal data transmitted from the vehicle control apparatus.

SUMMARY

The present disclosure has been made to solve the above-mentioned problems occurring in the prior art while advantages achieved by the prior art are maintained intact.

An aspect of the present disclosure improves security of communication for transmitting data from a vehicle control apparatus to the outside using a hardware security module (HSM), which is a dedicated semiconductor chip for vehicle, when using a unified diagnostic service (UDS) protocol.

Furthermore, another aspect of the present disclosure provides a technology of embodying security related contents of the UDS protocol and establishing a secure communication channel between the vehicle control apparatus and a diagnostic device.

Furthermore, another aspect of the present disclosure provides a technology where the vehicle control apparatus and the diagnostic device may share a key for decoding encoded data and may transmit, receive, and process the encoded data.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control apparatus may include a processor including a host core and a hardware security module (HSM) core. The processor may be configured to generate a first private key and a first public key, receive a second public key from a diagnostic device, generate a shared key based on the first private key and the second public key, receive a security data transmission request from the diagnostic device, and encode data based on the shared key and transmit the encoded data to the diagnostic device.

According to an embodiment of the present disclosure, the host core may include a security sub-layer for a security mode notification and a security data transmission response and an HSM driver that connects the security sub-layer with the HSM core.

According to an embodiment of the present disclosure, the HSM core may be configured to perform a crypto algorithm to encode the data.

According to an embodiment of the present disclosure, the HSM core may include a security storage storing key information for encoding the data.

According to an embodiment of the present disclosure, the processor may generate the first public key based on the first private key.

According to an embodiment of the present disclosure, the host core may deliver a first internal command including second public key delivery, the security data transmission request, and a shared key generation request to the HSM core.

According to an embodiment of the present disclosure, the HSM core may generate the shared key and may deliver the first public key to the host core.

According to an embodiment of the present disclosure, the host core may deliver a second internal command including a request to encode the data corresponding to an identification of the vehicle control apparatus and a request to provide the encoded data to the HSM core.

According to an embodiment of the present disclosure, the HSM core may encode the data based on the shared key and may deliver the encoded data to the host core.

According to an embodiment of the present disclosure, the host core may receive encoded data from the diagnostic device and may deliver a third internal command including the encoded data and a data decoding request to the HSM core.

According to an embodiment of the present disclosure, the HSM core may decode the encoded data transmitted from the diagnostic device based on the shared key and may deliver the decoded data to the host core.

According to an embodiment of the present disclosure, the host core may process the decoded data in an application and may return a response to the diagnostic device based on the result of processing the decoded data.

According to another aspect of the present disclosure, a control method of a vehicle control apparatus may include generating a first private key and a first public key, receiving a second public key from a diagnostic device, generating a shared key based on the first private key and the second public key, receiving a security data transmission request from the diagnostic device, and encoding data based on the shared key and transmitting the encoded data to the diagnostic device.

According to an embodiment of the present disclosure, the generating of the shared key may include delivering, by a host core, a first internal command including second public key delivery, the security data transmission request, and a shared key generation request to an HSM core and generating, by the HSM core, the shared key and delivering, by the HSM core, the first public key to the host core.

According to an embodiment of the present disclosure, the encoding of the data based on the shared key and the transmitting of the encoded data to the diagnostic device may include delivering, by a host core, a second internal command including a request to encode the data corresponding to an identification of a vehicle control apparatus and a request to provide the encoded data to an HSM core and encoding, by the HSM core, the data based on the shared key and delivering, by the HSM core, the encoded data to the host core.

According to an embodiment of the present disclosure, the control method may further include connecting a security sub-layer to an HSM core based on an HSM driver in response to receiving the security data transmission request from the diagnostic device and performing, by the security sub-layer, a security notification and a security data transmission response.

According to an embodiment of the present disclosure, the encoding of the data based on the shared key and the transmitting of the encoded data to the diagnostic device may include encoding the data by executing a crypto algorithm by an HSM core.

According to an embodiment of the present disclosure, the generating of the first private key and the first public key may include storing key information for encoding the data in a security storage of an HSM core.

According to an embodiment of the present disclosure, the generating of the first private key and the first public key may include generating the first public key based on the first private key.

According to an embodiment of the present disclosure, the control method may further include receiving, by a host core, the encoded data from the diagnostic device and delivering, by the host core, a third internal command including the encoded data from the diagnostic device and a data decoding request to an HSM core, after encoding the data based on the shared key and transmitting the encoded data to the diagnostic device, decoding, by the HSM core, the encoded data based on the shared key and delivering, by the HSM core, the decoded data to the host core, processing, by the host core, the decoded data in an application, and returning, by the host core, a response to the diagnostic device based on the result of processing the decoded data.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
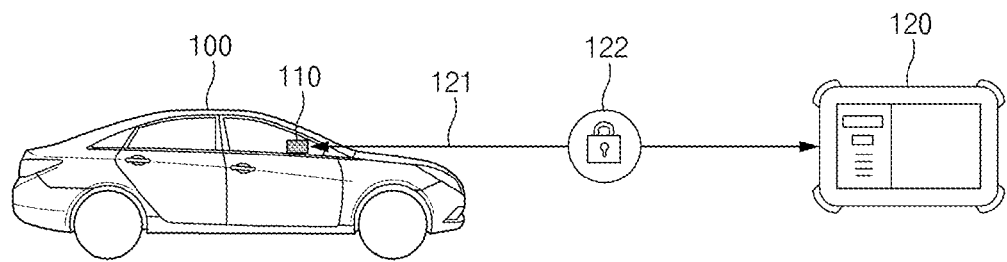
FIG. 1 is a drawing illustrating diagnostic communication between a vehicle and a diagnostic device.

Hereinafter, some embodiments of the present disclosure will be described in detail with reference to the accompanying drawings. In adding the reference numerals to the components of each drawing, it should be noted that the identical component is designated by the identical numerals even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A.", "B", (a), (b), and the like may be used. These terms are merely intended to distinguish one component from another component, and the teams do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 10.

FIG. 1 is a drawing illustrating diagnostic communication between a vehicle and a diagnostic device.

Referring to FIG. 1, a vehicle 100 may include a vehicle control apparatus 110. The vehicle control apparatus 110 may be implemented in the vehicle 100. For example, the vehicle control apparatus 110 may be integrally configured with transmission control units of the vehicle 100 and control units in the vehicle 100. For another example, the vehicle control apparatus 110 may be implemented as a separate device to be connected with the control units of the vehicle 100 by a separate connection means. The vehicle control apparatus 110 may control the overall electronic operation of the vehicle 100. The vehicle control apparatus 110 may be an integrated body control unit (IBU). The vehicle control apparatus 110 may include a processor (e.g., a processor 1100 of FIG. 10).

The diagnostic device 120 may be a device which diagnoses a state of the vehicle 100. The diagnostic device 120 may determine whether the vehicle 100 breaks down and a breakdown situation of the vehicle 100. For example, the diagnostic device 120 may be a portable global diagnostic system (GDS) device.

The vehicle control apparatus 110 may establish a channel 121 for communicating with the diagnostic device 120. The vehicle control apparatus 110 may communicate with the diagnostic device 120. For example, the vehicle control apparatus 110 may perform diagnostic communication, such as a controller area network (CAN) communication, with the diagnostic device 120. When performing the diagnostic communication, the diagnostic device 120 may request the vehicle control apparatus 110 to transmit data.

The vehicle control apparatus 110 may transmit data requested by the diagnostic device 120. For example, the vehicle control apparatus 110 may transmit vehicle state data necessary for diagnosis of the vehicle 100 depending on the request of the diagnostic device 120. The vehicle state data may include a vehicle information number (VIN), position information, event occurrence information, and a log record. For another example, the vehicle control apparatus 110 may transmit storage data including personal information, such as owner information, to the diagnostic device 120.

The vehicle control apparatus 110 may transmit data including sensitive information for supporting various services requested by the diagnostic device 120. When ensuring the secure channel 121 between the vehicle control apparatus 110 and the diagnostic device 120, the vehicle control apparatus 110 may block data including sensitive information from being hacked or stolen.

The channel 121 for communication between the vehicle control apparatus 110 and the diagnostic device 120 may have a security means 122. The security means 122 may defend data transmitted from the vehicle control apparatus 110 from being hacked or stolen. When transmitting data from the vehicle control apparatus 110 to the diagnostic device 120, the security means 122 may be applied to a unified diagnostic service (UDS) protocol specified by ISO-14229-1. A standard UDS protocol may implement security data transmission by means of the security means 122.

Figure 2:
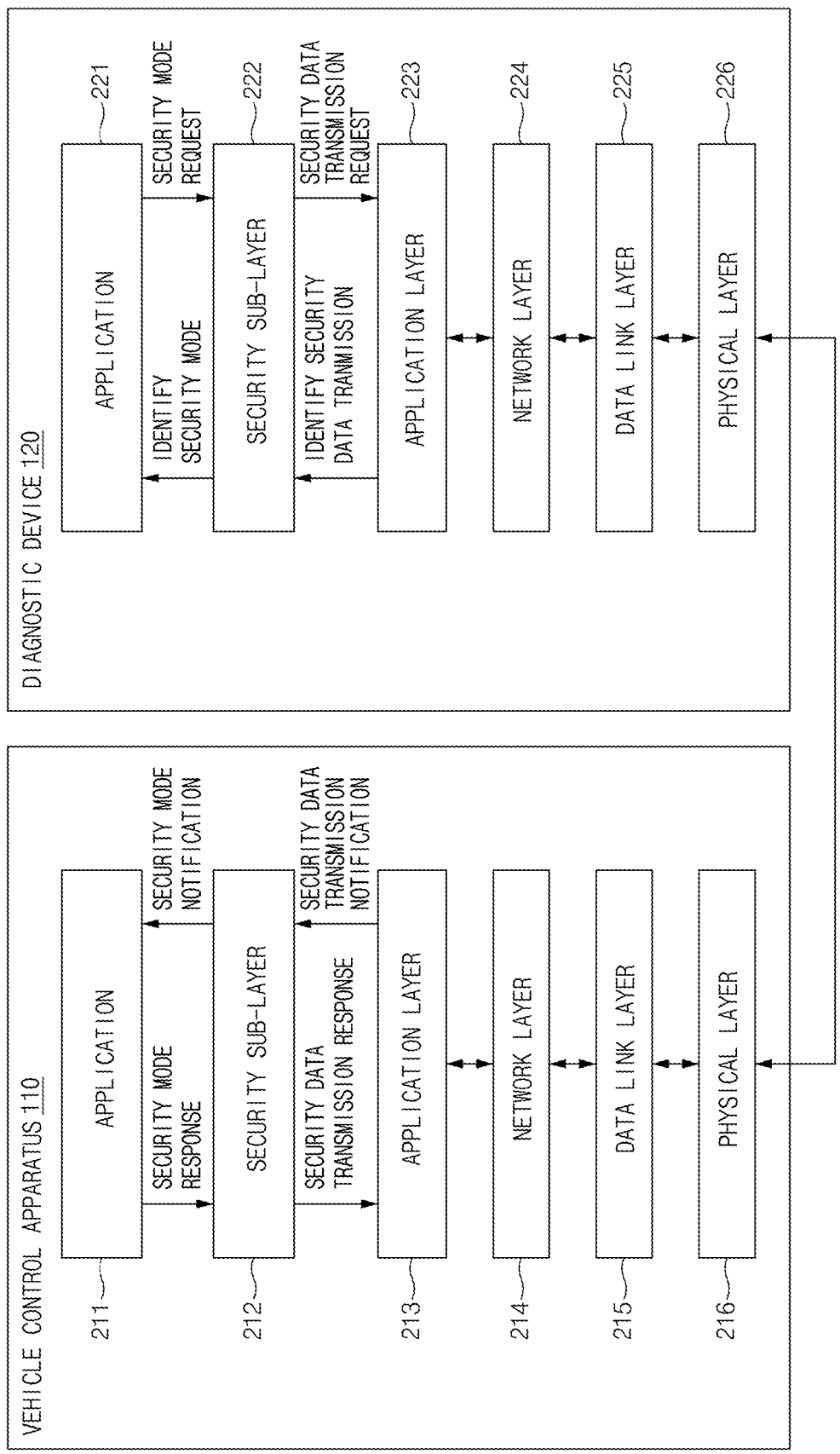
FIG. 2 is a drawing illustrating security data transmission of a unified diagnostic service (UDS) protocol.

FIG. 2 is a drawing illustrating security data transmission of a UDS protocol.

A vehicle control apparatus 110 may include an application 211, a security sub-layer 212, an application layer 213, a network layer 214, a data link layer 215, and a physical layer 216. A diagnostic device 120 may include an application 221, a security sub-layer 222, an application layer 223, a network layer 224, a data link layer 225, and a physical layer 226.

The application 221 of the diagnostic device 120 may deliver a signal requesting the security sub-layer 222 of the diagnostic device 120 to perform a security mode. The security sub-layer 222 of the diagnostic device 120 may deliver a signal requesting the application layer 223 of the diagnostic device 120 to transmit security data. The diagnostic device 120 may request the vehicle control apparatus 110 to transmit security data using the application layer 223, the network layer 224, the data link layer 225, and the physical layer 226.

The vehicle control apparatus 110 may receive a security data transmission request using the physical layer 216, the data link layer 215, the network layer 214, and the application layer 213. The application layer 213 of the vehicle control apparatus 110 may deliver a notification of receiving the request to transmit the security data to the security sub-layer 212 of the vehicle control apparatus 110. The security sub-layer 212 of the vehicle control apparatus 110 may deliver a signal notifying the application 211 of the vehicle control apparatus 110 of a security mode state to the application 211 of the vehicle control apparatus 110.

The application 211 of the vehicle control apparatus 110 may deliver a response of being a security mode to the security sub-layer 212 of the vehicle control apparatus 110. The security sub-layer 212 of the vehicle control apparatus 110 may deliver a response of transmitting security data to the application layer 213 of the vehicle control apparatus 110. The vehicle control apparatus 110 may transmit security data to the diagnostic device 120 using the application layer 213, the network layer 214, the data link layer 215, and the physical layer 216.

The diagnostic device 120 may receive the security data using the physical layer 226, the data link layer 225, the network layer 224, and the application layer 223. The application layer 223 of the diagnostic device 120 may deliver a signal identifying the reception of the security data to the security sub-layer 222 of the diagnostic device 120. The security sub-layer 222 of the diagnostic device 120 may deliver a signal identifying a security mode sate to the application 221 of the diagnostic device 120.

A UDS protocol specified by the existing ISO-14229-1 uses the secured data transmission 0x84 service for data transmission. The secured data transmission 0x84 service does not describe contents about how to implement security on the security sub-layer 222. The present disclosure is to provide a detailed method for implementing security on the security sub-layer 222.

Figure 3:
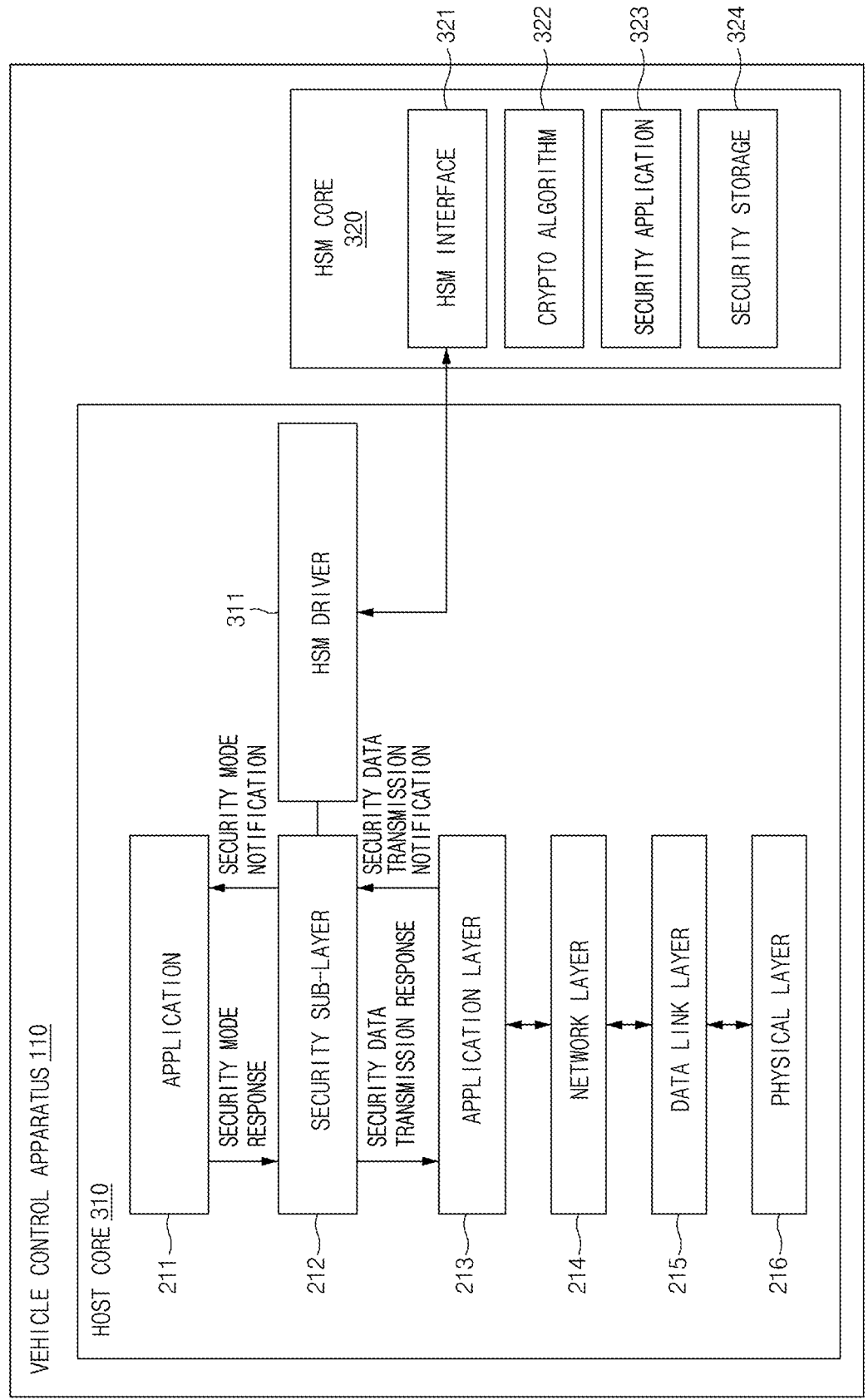
FIG. 3 is a diagram illustrating a vehicle control apparatus according to an embodiment of the present disclosure.

Hereinafter, a description will be given in detail of a vehicle control apparatus according to an embodiment of the present disclosure with reference to FIG. 3. FIG. 3 is a diagram illustrating a vehicle control apparatus according to an embodiment of the present disclosure.

A vehicle control apparatus 110 may include a host core 310 and a hardware security module (HSM) core 320. The host core 310 may perform security data transmission. The HSM core 320 may establish a security environment for security data transmission.

A host core 310 may include an application 211, a security sub-layer 212, an application layer 213, a network layer 214, a data link layer 215, a physical layer 216, and a HSM driver 311. The application 211, the security sub-layer 212, the application layer 213, the network layer 214, the data link layer 215, and physical layer 216 may perform a security mode notification and a security data transmission response.

The HSM driver 311 may include an HSM application programming interface (API). The HSM driver 311 may connect the security sub-layer 212 with the HSM core 320. The HSM driver 311 may link the security sub-layer 212 with the HSM core 320 to improve data transmission security of the security sub-layer 212.

The HSM core 320 may establish a security environment upon the security mode notification and the security data transmission response of the security sub-layer 212. The HSM core 320 may include an HSM interface 321, a crypto algorithm 322, a security application 323, and a security storage 324.

The HSM interface 321 may receive data from the HSM driver 311. The HSM interface 321 may transmit data to the HSM driver 311. The HSM interface 321 may provide a resource the HSM core 320 has to improve data transmission security to the security sub-layer 212 through the HSM driver 311.

The crypto algorithm 322 may be an algorithm for encoding data transmitted by the security sub-layer 212. The crypto algorithm 322 may be provided to the security sub-layer 212 through the HSM interface 321.

The security application 323 may be an application program for controlling an operation of the HSM core 320. The security storage 324 may store data used for an operation of the HSM core 320. The security storage 324 may store pieces of information used when establishing a security environment to improve data transmission security of the security sub-layer 212. For example, the security storage 324 may store key information for encoding data. For another example, the security storage 324 may store key information for decoding data.

The security sub-layer 212 may request the HSM core 320 to generate a shared key and encode data using a 0x84 service additional protocol among UDS protocols. The HSM core 320 may generate a shared key using key information stored in the security storage 324. The HSM core 320 may encode data using the crypto algorithm 322. By using the HSM core 320 independent of the host core 310, a previously used session key may be securely maintained.

The present disclosure may generate a key by means of linking the HSM core 320 in a secured data transmission 0x84 service architecture and may establish a security environment using the crypto algorithm 322. Furthermore, the present disclosure may provide a shared key generation procedure used to encode and decode data. Furthermore, the present disclosure may define contents of a protocol associated with the secured data transmission 0x84 service in detail.

A description will be given in detail of a control method of a vehicle control apparatus according to an embodiment of the present disclosure with reference to FIGS. 4 and 8. Hereinafter, it is assumed that an autonomous control apparatus 110 of FIG. 3 performs a process of FIGS. 4 to 8. Furthermore, in a description of FIGS. 4 to 8, an operation described as being performed by the vehicle control apparatus 110 may be understood as being controlled by (or performed by) a processor (e.g., a processor 1100 of FIG. 10) of the autonomous control apparatus 110.

Figure 4:
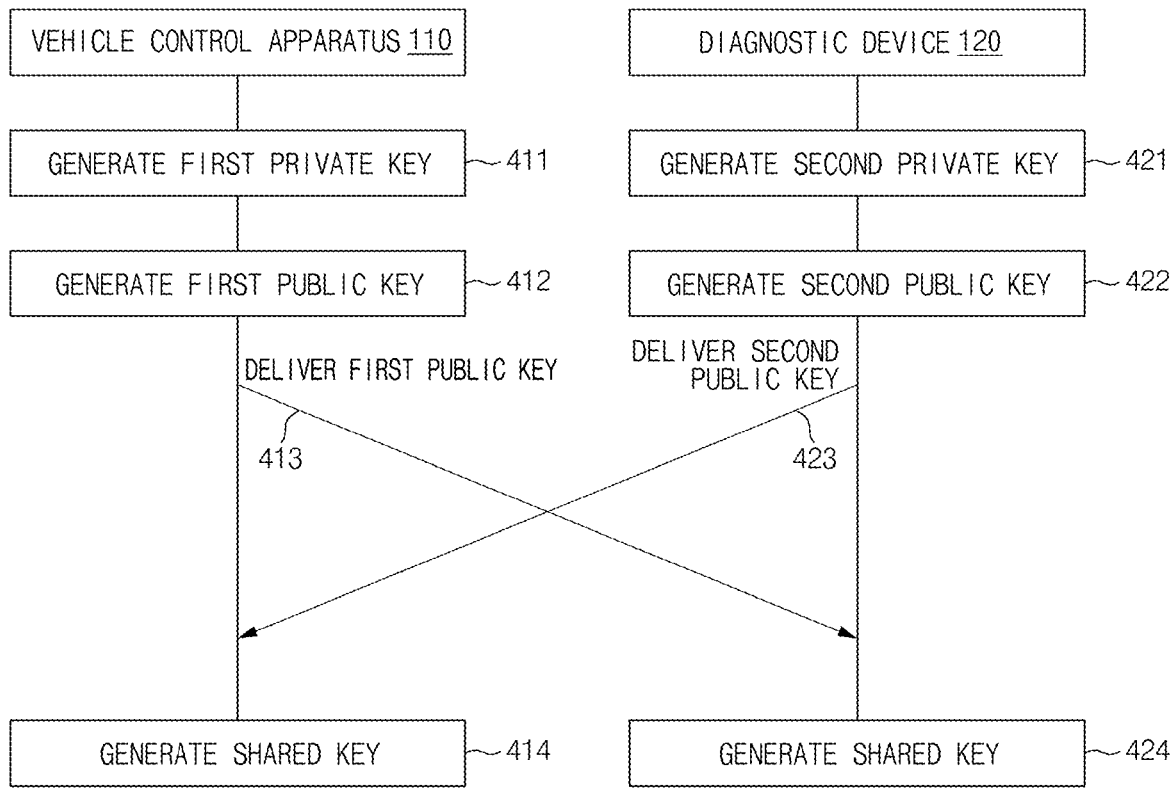
FIG. 4 is a signal sequence diagram illustrating a method for generating a shared key in a vehicle control apparatus and a diagnostic device according to an embodiment of the present disclosure.

FIG. 4 is a signal sequence diagram illustrating a method for generating a shared key in a vehicle control apparatus and a diagnostic device according to an embodiment of the present disclosure.

In operation 411, a vehicle control apparatus 110 may generate a first private key. The first private key may be a secret key of the vehicle control apparatus 110, elliptic curve cryptography (ECC) of which is performed. The first private key may be a unique key of the vehicle control apparatus 110, which is incapable of being shared with a diagnostic device 120. In operation 412, the vehicle control apparatus 110 may generate a first public key. The first public key may be generated by multiplying the first private key by a specified first constant. In operation 413, the vehicle control apparatus 110 may deliver the first public key to the diagnostic device 120.

In operation 421, the diagnostic device 120 may generate a second private key. The second private key may be a secret key of the diagnostic device 120, the ECC of which is performed. The second private key may be a unique key of the diagnostic device 120, which is incapable of being shared with the vehicle control apparatus 110. In operation 422, the diagnostic device 120 may generate a second public key. The second public key may be generated by multiplying the second private key by the first constant. In operation 423, the diagnostic device 120 may deliver the second public key to the vehicle control apparatus 110.

In operation 414, the vehicle control apparatus 110 may generate a shared key. The shared key in operation 414 may be generated by multiplying the first private key generated by the vehicle control apparatus 110 by the second public key provided by the diagnostic device 120. In operation 424, the diagnostic device 120 may generate a shared key. The shared key in operation 424 may be generated by multiplying the second private key generated by the diagnostic device 120 by the first public key provided by the vehicle control apparatus 110. When multiplying the first private key generated by the vehicle control apparatus 110 by the second public key provided by the diagnostic device 120, the vehicle control apparatus 110 may generate a shared key having a value obtained by multiplying the first private key generated by the vehicle control apparatus 110, the second private key generated by the diagnostic device 120, and the first constant. When multiplying the second private key generated by the diagnostic device 120 by the first public key provided by the vehicle control apparatus 110, the diagnostic device 120 may generate a shared key having a value obtained by multiplying the first private key generated by the vehicle control apparatus 110, the second private key generated by the diagnostic device 120, and the first constant. Thus, each of the vehicle control apparatus 110 and the diagnostic device 120 may generate the shared key. The vehicle control apparatus 110 and the diagnostic device 120 may have the same shared key and may encode and decode data using the same shared key.

The vehicle control apparatus 110 and the diagnostic device 120 may exchange the first public key and the second public key with each other to generate the shared key capable of encoding a decoding data. When exchanging the first public key and the second public key to generate the shared key, the vehicle control apparatus 110 and the diagnostic device 120 may use an elliptic-curve Diffie-Hellman (ECDH) algorithm. The vehicle control apparatus 110 may generate the shared key using the first private key, the second public key, and the ECDH algorithm. The diagnostic device 120 may generate the shared key using the second private key, the first public key, and the ECDH algorithm. Because communication between the vehicle control apparatus 110 and the diagnostic device 120 does not corresponding to time critical communication, it may take a time until the shared key is generated. When the vehicle control apparatus 110 and the diagnostic device 120 are connected to each other, they may generate the shared key.

The HSM core 320 may define to transmit security data after an identification (ID) in the 0x84 service. The present disclosure may define contents of a request message of the HSM core 320 in detail. A first byte of the request message of the HSM core 320 may be composed of a 0x84 secured data transmission request service identification. The present disclosure may newly add a sub-function to a second byte of the request message of the HSM core 320. The second byte of the request message of the HSM core 320 may define a data transmission type. The second byte of the request message of the HSM core 320 may define a record for a subsequent security data transmission request. The corresponding value may be shown in Tables 1 and 2 below.

TABLE 1

| Data Byte | Parameter Name | Byte Value |
|---|---|---|
| #1 | Secured Data Transmission Request Service ID | 0x84 |
| #2 | Sub-function = [Data Transmission Type] | 0x00~0xFF |
| #3~#n (where n is a natural | security Data Request Record = [security Data Parameter #1~security Data Parameter #m] (where m is a natural | #XXh~#XXh |

TABLE 1-continued

| Data Byte | Parameter Name | Byte Value |
|---|---|---|
| number of 3 or more) | number) | |

TABLE 2

| Byte Value | Description |
|---|---|
| 0x00 | Exchange public key<br>Exchange public key to generate shared key<br>Fill data to be used as external tool of elliptic-curve encoded public key<br>Transmit its own public key when transmitting response message<br>✗ Public key is not encoded because of public information |
| 0x01 | Request Data by Identifier<br>Substantially the same as data request (0x22) service by Identifier<br>Received data is 2-byte data ID (DID)<br>Transmit data encoded according to DID |
| 0x02~0xXX | Security Data Transmission<br>Encode and transmit predefined data |

Referring to Tables 1 and 2 above, the present disclosure may define at least one or more data transmission types after a 0x84 service identification which is not defined in an existing international standard specification.

0X00 of a UDS protocol among the data transmission types is an exchange public key. A corresponding service may generate a shared key to be used for encoding and/or decoding in one session by means of the public key exchange algorithm described in conjunction with FIG. 4. The diagnostic device 120 may transmit 0x00 when initially transmitting a service and may deliver a second public key having a 256-byte size from a subsequent data byte. The vehicle control apparatus 110 may receive a request and may deliver the first public key of the vehicle control apparatus 110 to the diagnostic device 120 in response to the same sub-function 0x00.

0x22 of the UDS protocol among the data transmission types may be an identification (ID), which may request data. Data transmitted from a data byte after initially transmitting the service may include a 2-byte data ID (DID). The vehicle control apparatus 110 may receive 0x22 and may respond with encoded data corresponding to the received DID.

When initially transmitting the service among the data transmission types, subsequent sub-functions may perform a function of sequentially transmitting security data. For example, the sub-functions may transmit a type of the vehicle, which is defined in the vehicle control apparatus 110, and data, encoding of which is completed in the vehicle control apparatus 110. For another example, the sub-functions may cause the vehicle control apparatus 110 to receive encoded data. The vehicle control apparatus 110 may decode the encoded data and may process the decoded data.

The vehicle control apparatus 110 may transmit a response to the diagnostic device 120 based on the result of processing the data. The response may be a positive response or a negative response. When receiving a parameter unsuitable for specifications defined in Tables 1 and 2, the vehicle control apparatus 110 may transmit the negative response. For example, when a next data byte after sub-function 0x01 is not 2 bytes or is not a predefined DID, the vehicle control apparatus 110 may transmit the negative response. When receiving sub-function 0x01 or 0x02 before sub-function 0x00, the vehicle control apparatus 110 may transmit the negative response. The vehicle control apparatus 110 may transmit the positive response or the negative response to the diagnostic device 120 using a negative response code (NRC) defined by the standard in ISO 14229-1.

Figure 5:
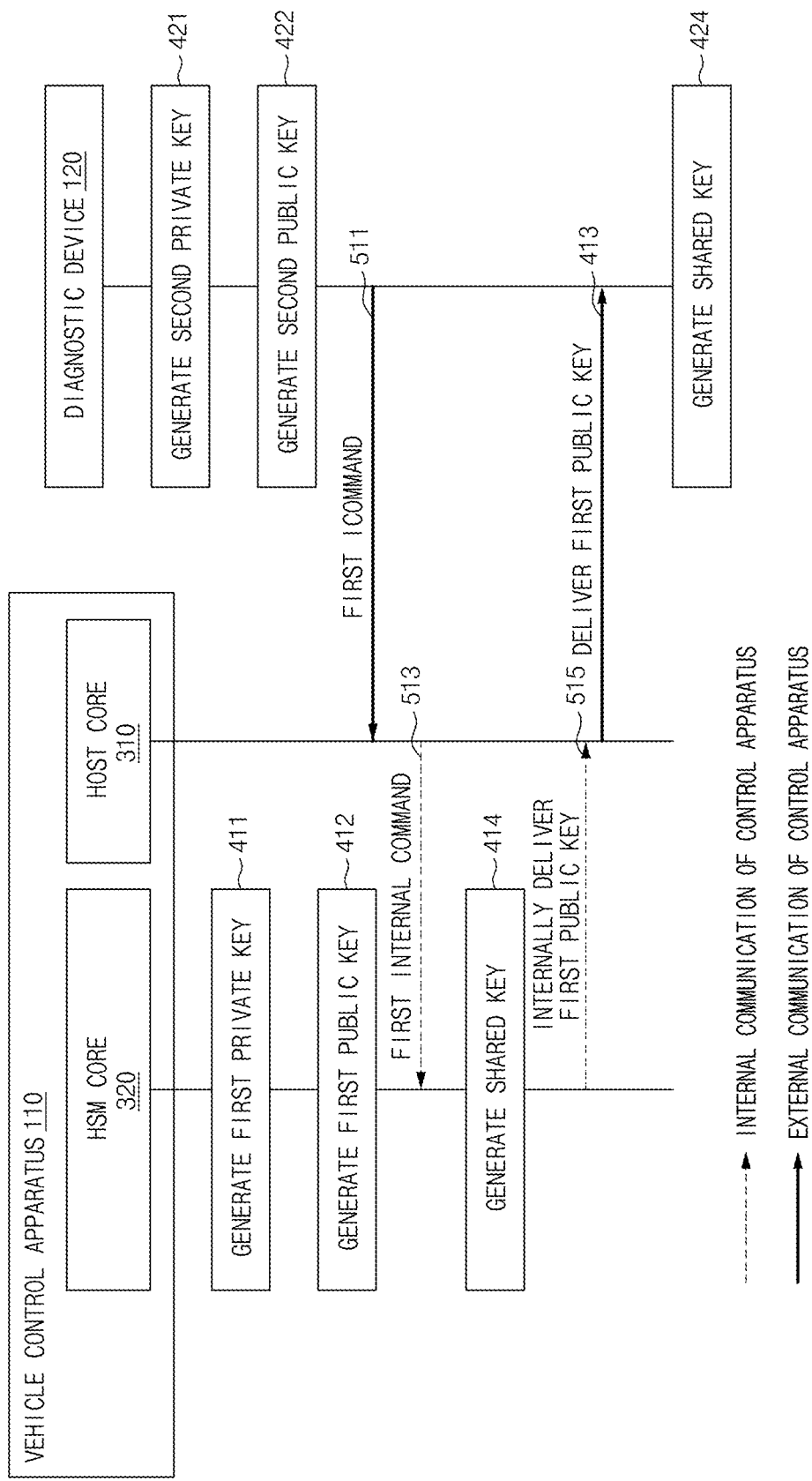
FIG. 5 is a signal sequence diagram illustrating a method for generating a shared key in a vehicle control apparatus and a diagnostic device according to an embodiment of the present disclosure.

FIG. 5 is a signal sequence diagram illustrating a method for generating a shared key in a vehicle control apparatus and a diagnostic device according to an embodiment of the present disclosure.

In operation 411, a HSM core 320 of a vehicle control apparatus 110 may generate a first private key. In operation 412, the HSM core 320 may generate a first public key. In operation 421, the diagnostic device 120 may generate a second private key. In operation 422, the diagnostic device 120 may generate a second public key. The vehicle control apparatus 110 and the diagnostic device 120 may generate a private key and a public key matched with the private key depending on the same elliptic curve crypto algorithm.

In operation 511, the diagnostic device 120 may transmit a first command to a host core 310 of the vehicle control apparatus 110. The first command may include second public key delivery and a security data transmission request. The diagnostic device 120 may request the host core 310 to transmit security data at the same as delivering the second public key to the host core 310 by means of the first command. For example, the diagnostic device 120 may transmit a message of a structure like Table 3 below to the host core 310.

TABLE 3

| Data Byte | Parameter Name | Byte Value |
|---|---|---|
| #1 | Secured Data Transmission Request Service ID | 0x84 |
| #2 | Sub-function = [Data Transmission Type] → Exchange Public key | 0x00 |
| #3~#259 | Security Data Request Record = [Public key of the external diagnostic Tool (e.g., the vehicle control apparatus 110)] | #XXh~ #XXh |

In operation 513, the host core 310 may deliver a first internal command to the HSM core 320. The first internal command may include second public key delivery, a security data transmission request, and a shared key generation request. The host core 310 may deliver the first command to the HSM core 320 by means of the first internal command and may simultaneously request the HSM core 320 to generate a shared key.

In operation 414, the HSM core 320 may generate the shared key. In operation 515, the HSM core 320 may internally deliver the first public key to the host core 310. In operation 413, the host core 310 may deliver the first public key to the diagnostic device 120. In operation 424, the diagnostic device 120 may generate the shared key. The vehicle control apparatus 110 and the diagnostic device 120 may deliver the public key with each other and may generate the shared key to use encode data using a previously possessed private key and the delivered public key. Because the private key is securely stored in each of the vehicle control apparatus 110 and the diagnostic device 120, it impossible for the third party to generate the shared key although the third party intercepts the public key in the middle of a communication channel. Thus, because it is able to block leakage of data by the stealing of the key, the vehicle control apparatus 110 and the diagnostic device 120 may improve security of the communication channel.

Figure 6:
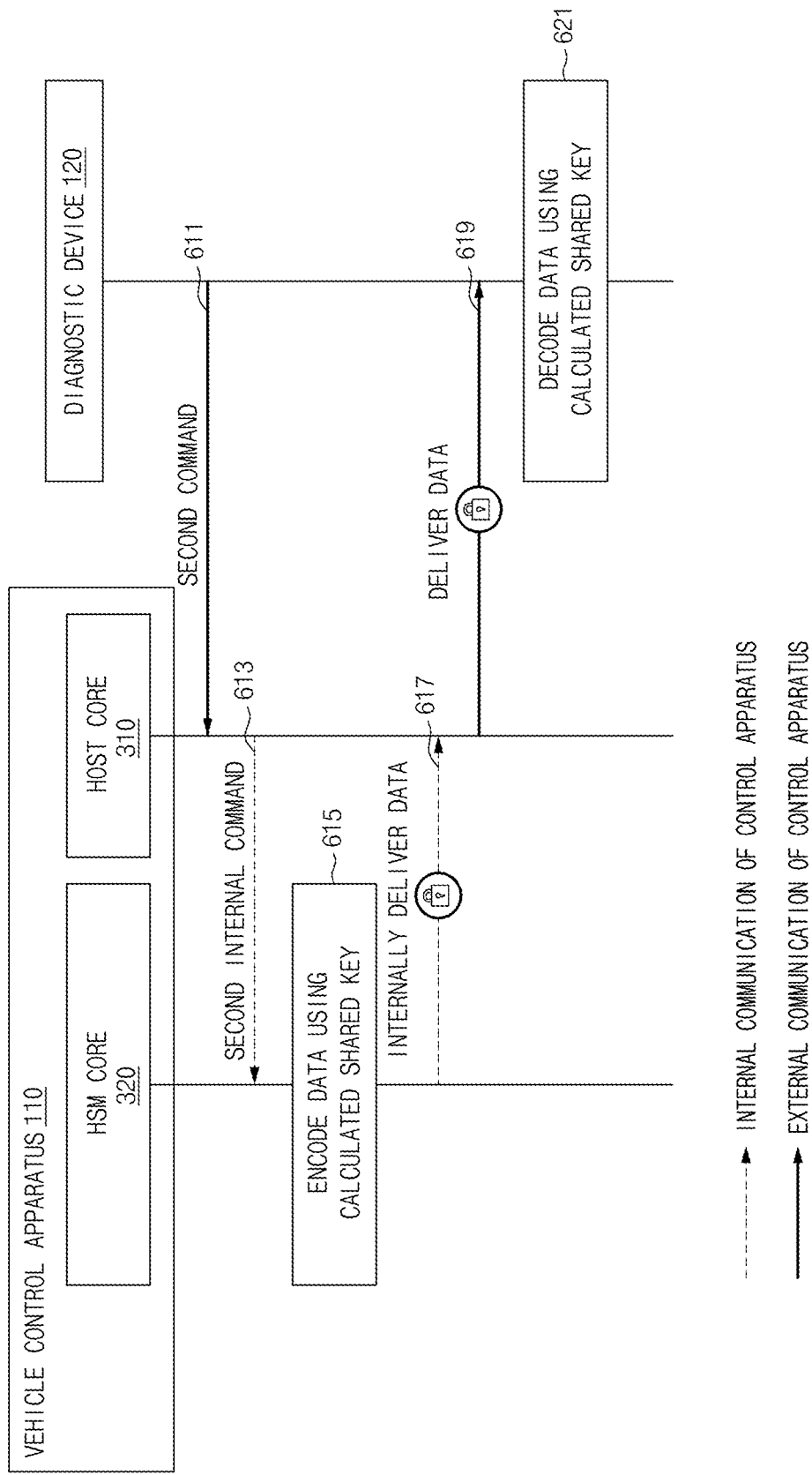
FIG. 6 is a signal sequence diagram illustrating a method for encoding and transmitting data in a vehicle control apparatus according to an embodiment of the present disclosure.

FIG. 6 is a signal sequence diagram illustrating a method for encoding and transmitting data in a vehicle control apparatus according to an embodiment of the present disclosure.

FIG. 6 illustrates operations after a vehicle control apparatus 110 and a diagnostic device 120 generates a shared key by operations described with reference to FIG. 4 and/or FIG. 5. The vehicle control apparatus 110 and the diagnostic device 120 may store a private key, a public key, and a shared key generated by an elliptic curve crypto algorithm in a storage (e.g., a security storage 324 of FIG. 3) of an HSM (e.g., an HSM core 320).

In operation 611, the diagnostic device 120 may transmit a second command to a host core 310 of the vehicle control apparatus 110. The second command may include a security data transmission request. The second command may be a request to provide the diagnostic device 120 with data corresponding to an identification (ID) of the vehicle control apparatus 110. For example, the diagnostic device 120 may transmit a message of a structure like Table 4 below to the host core 310.

TABLE 4

| Data Byte | Parameter Name | Byte Value |
| --- | --- | --- |
| #1 | Secured Data Transmission Request Service ID | 0x84 |
| #2 | Sub-function = [Data Transmission Type] → Request Data by Identifier | 0x01 |
| #3, #4 | Security Data Request Record = [Data ID] | #XXh, #XXh |

In operation 613, the host core 310 may transmit a second internal command to the HSM core 320 of the vehicle control apparatus 110. The second internal command may include a request to encode data corresponding to the ID of the vehicle control apparatus 110 and a request to provide the encoded data.

In operation 615, the HSM core 320 may encode data such as diagnostic data using the shared key calculated in operation 414 of FIG. 4 and/or FIG. 5. In operation 617, the HSM core 320 may internally deliver the data. The HSM core 320 may deliver the data encoded using the public key to the host core 310. In operation 619, the host core 310 may deliver the data to the diagnostic device 120. The host core 310 may transmit the encoded data to the outside over a channel in which a security environment is established. In operation 621, the diagnostic device 120 may decode the data using the shared key calculated in operation 424 of FIG. 4 and/or FIG. 5.

Figure 7:
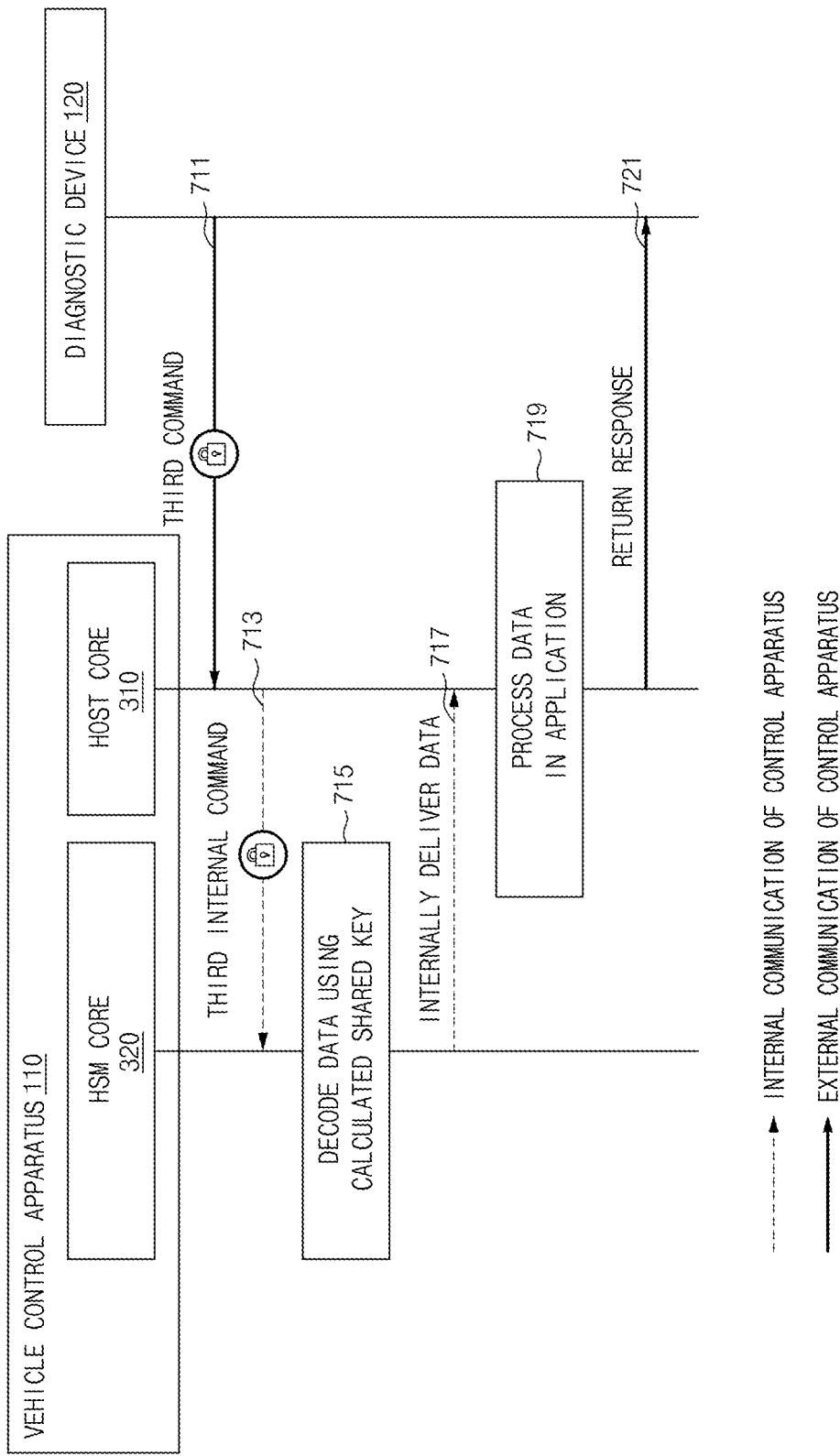
FIG. 7 is a signal sequence diagram illustrating a method for receiving encoded data and returning the response in a vehicle control apparatus according to an embodiment of the present disclosure.

FIG. 7 is a signal sequence diagram illustrating a method for receiving encoded data and returning the response in a vehicle control apparatus according to an embodiment of the present disclosure.

In operation 711, a diagnostic device 120 may transmit an encoded third command to a host core 310 of a vehicle control apparatus 110. The encoded third command may be encoded data. The diagnostic device 120 may deliver the encoded data to the vehicle control apparatus 110, as well as receiving the encoded data from the vehicle control apparatus 110. For example, the diagnostic device 120 may transmit a message of a structure like Table 5 below to the host core 310.

TABLE 5

| Data Byte | Parameter Name | Byte Value |
| --- | --- | --- |
| #1 | Secured Data Transmission Request Service ID | 0x84 |
| #2 | Sub-function = [Data Transmission Type] → Send Security Data | 0x02 |
| #3~#n (where n is a natural number of 3 or more) | Security Data Request Record = [security Data Parameter #1~security Data Parameter #m] | #XXh~ #XXh |

In operation 713, the host core 310 may deliver the encoded third internal command to an HSM core 320 of the vehicle control apparatus 110. The third internal command may include encoded data and a data decoding request.

In operation 715, the HSM core 320 may decode the data using the calculated shared key. In operation 717, the HSM core 320 may perform data internal delivery of delivering the decoded data to the host core 310.

In operation 719, the host core 310 may process data in an application (e.g., an application 211 of FIG. 3). In operation 721, the host core 310 may transmit a response to the diagnostic device 120. The response may be a positive response or a negative response. The host core 310 may transmit the positive response or the negative response to the diagnostic device 120 depending on the result of processing the data. Thus, the diagnostic device 120 may securely deliver the encoded data to the vehicle control apparatus 110, and the vehicle control apparatus 110 may process the encoded data to return a response to the diagnostic device 120.

Figure 8:
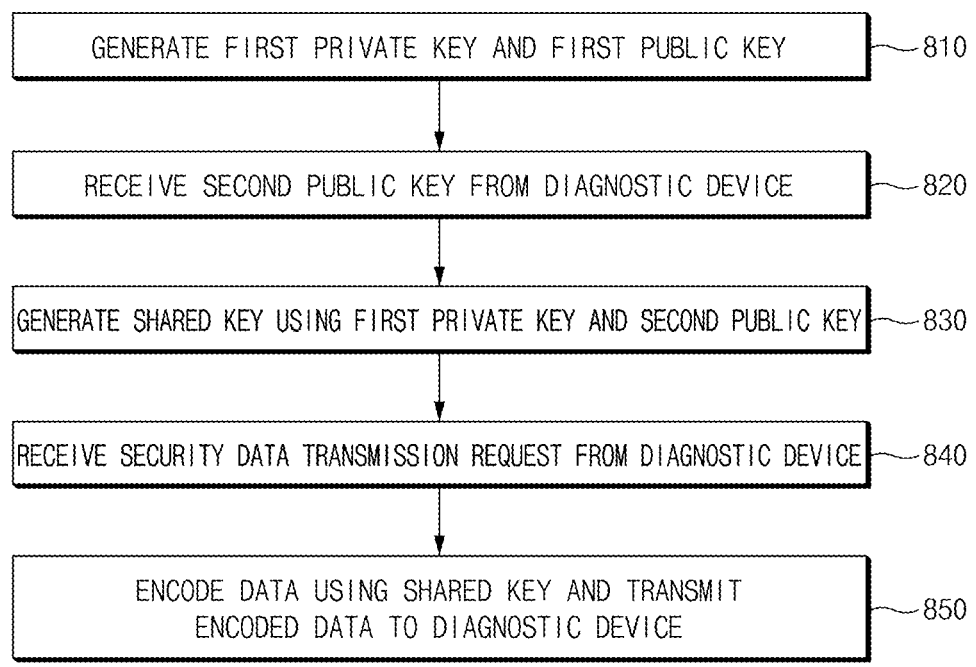
FIG. 8 is a flowchart illustrating a control method of a vehicle control apparatus according to an embodiment of the present disclosure.

FIG. 8 is a flowchart illustrating a control method of a vehicle control apparatus according to an embodiment of the present disclosure.

In operation 810, a processor 1100 of a vehicle control apparatus 110 may generate a first private key and a first public key. The processor 1100 may generate the first public key based on the first private key. The processor 1100 may store the first private key in a secure hardware security area (e.g., a security storage 324 of FIG. 3).

In operation 820, the processor 1100 of the vehicle control apparatus 110 may receive a second public key from a diagnostic device 120. The processor 1100 may receive the second public key using a secured data transmission 0x84 service of a UDS protocol. The processor 1100 may add a sub-function to a service ID of the secured data transmission 0x84 service. The processor 1100 may add a sub-function where the vehicle control apparatus 110 and the diagnostic device 120 exchanges a public key with each other.

In operation 830, the processor 1100 of the vehicle control apparatus 110 may generate a shared key using the first private key and the second public key. The processor 1100 may generate a shared key available between the vehicle control apparatus 110 and the diagnostic device 120 using an elliptic-curve Diffie-Hellman key exchange algorithm. The processor 1100 may store the first private key in the secure hardware security area to block the shared key from being stolen although the first public key and/or the second public key are/is leaked.

In operation 840, the processor 1100 of the vehicle control apparatus 110 may receive a security data request from the diagnostic device 120. The processor 1100 may receive a security data request according to the addition of the sub-function, which requests encoded data, from the diagnostic device 120. The security data request may include a 2-byte data ID (DID) from a third byte.

In operation 850, the processor 1100 of the vehicle control apparatus 110 may encode data using the shared key and transmit the encoded data to the diagnostic device 120. The processor 1100 may encode data using the shared key such that only the diagnostic device 120 having the shared key may decode the data. The processor 1100 may transmit the encoded data to the diagnostic device 120 to ensure secure data transmission.

Figure 9:
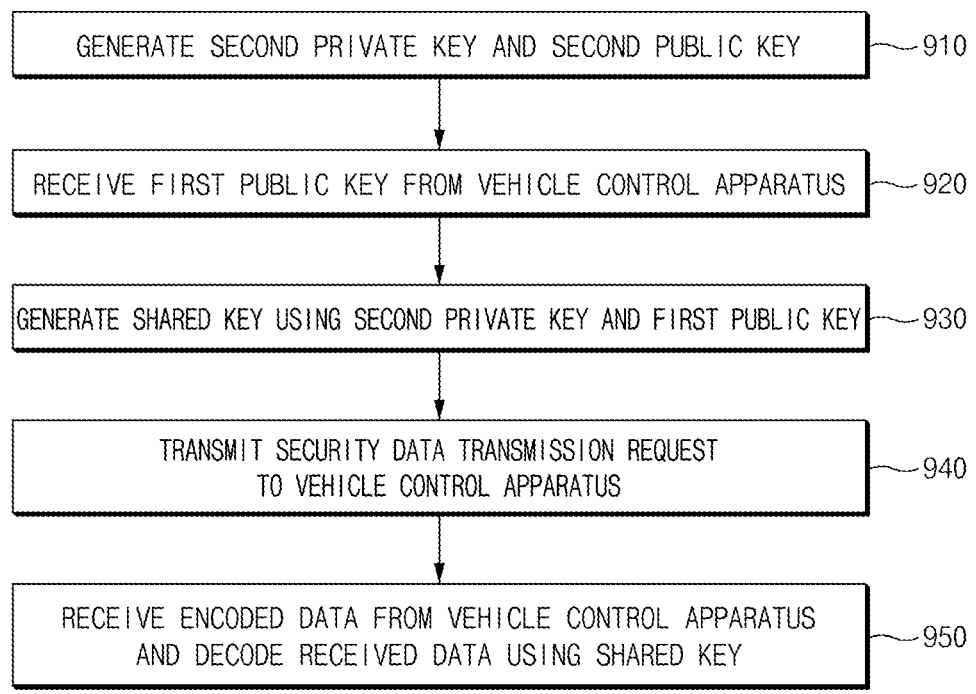
FIG. 9 is a flowchart illustrating a control method of a diagnostic device according to an embodiment of the present disclosure.

FIG. 9 is a flowchart illustrating a control method of a diagnostic device according to an embodiment of the present disclosure.

In operation 910, a diagnostic device 120 may generate a second private key and a second public key. The diagnostic device 120 may generate the second public key based on the second private key. The diagnostic device 120 may the second private key in a security area included in the diagnostic device 120.

In operation 920, the diagnostic device 120 may receive a first public key from a vehicle control apparatus 110. The diagnostic device 120 may receive the first public key using a secured data transmission 0x84 service of a UDS protocol.

In operation 930, the diagnostic device 120 may generate a shared key using the second private key and the first public key. The diagnostic device 120 may generate a shared key available between the vehicle control apparatus 110 and the diagnostic device 120 using an elliptic-curve Diffie-Hellman key exchange algorithm. The diagnostic device 120 may store the second private key in a secure hardware security area to block the shared key from being stolen although the first public key and/or the second public key are/is leaked.

In operation 940, the diagnostic device 120 may transmit a security data transmission request to the vehicle control apparatus 110.

In operation 950, the diagnostic device 120 may receive encoded data from the vehicle control apparatus 110 and may decode the received data using the shared key. The diagnostic device 120 may receive the encoded data in an environment with high security. The diagnostic device 120 may decode the received data using the shared key to process the received data.

Figure 10:
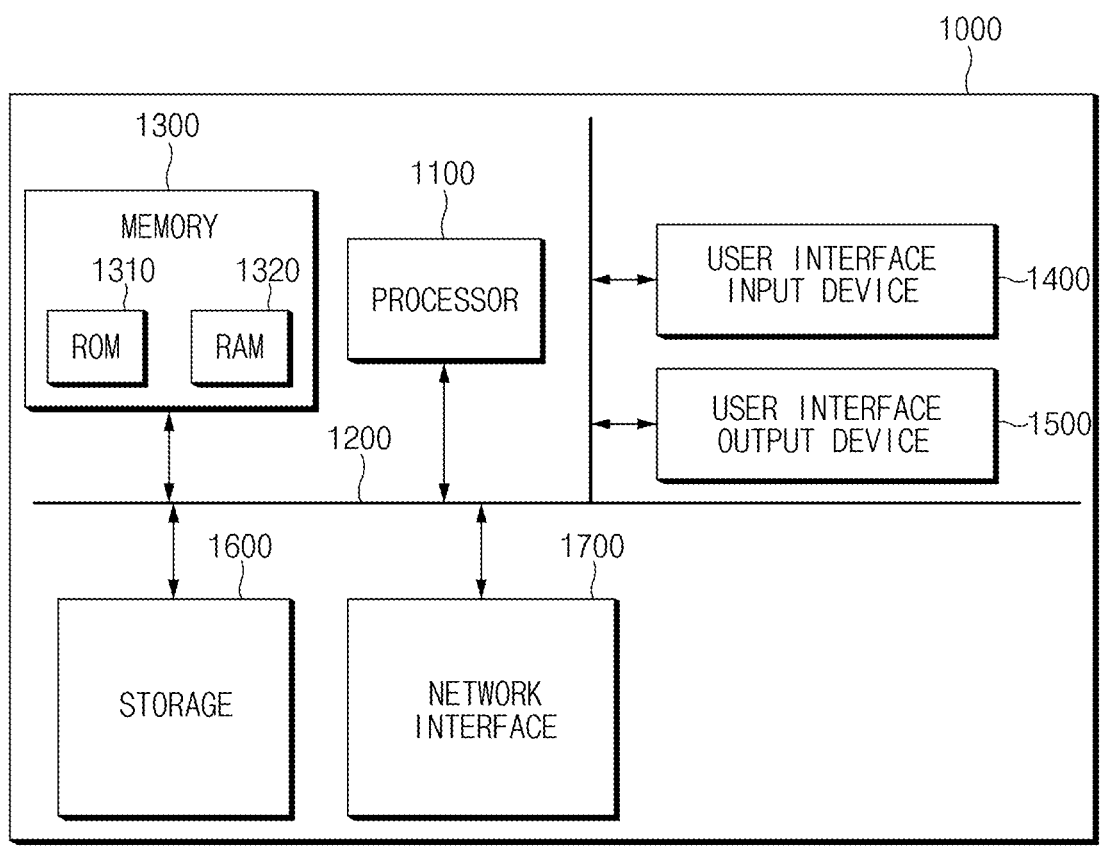
FIG. 10 illustrates a computing system according to an embodiment of the present disclosure.

FIG. 10 illustrates a computing system according to an embodiment of the present disclosure.

Referring to FIG. 10, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. When the software module or the algorithm is executed by the processor 1100, the processor 1100 may be configured to perform the above-described operations. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may improve security of communication for linking a hardware security module (HSM) to a security sub-layer associated with security data transmission of a unified diagnostic service (UDS) protocol and transmitting data from the vehicle control apparatus to the outside using a crypto algorithm and a key included in the HSM.

Furthermore, the present technology may embody security related contents of the UDS protocol and may establish a secure communication channel between the vehicle control apparatus and the diagnostic device.

Furthermore, the present technology may allow the vehicle control apparatus to receive data from the diagnostic device, as well as allowing the vehicle control apparatus to transmit data to the diagnostic device depending on various use forms.

Furthermore, the present technology may improve efficiency and security of delivering a key between the vehicle control apparatus and the diagnostic device.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A vehicle control apparatus, comprising:
a processor including a host core and a hardware security module (HSM) core,
wherein the processor is configured to:
generate a first private key and a first public key;
receive a second public key from a diagnostic device;
generate a shared key based on the first private key and the second public key;
receive a security data transmission request from the diagnostic device;
encode data based on the shared key and transmit the encoded data to the diagnostic device;
define secured data transmission request service identification, data transmission type, and a record for a subsequent security data transmission request;
transmit vehicle state data, including a vehicle information number, position information, event occurrence information, and a log record, necessary for diagnosis of the vehicle depending on the request of the diagnostic device; and transmit a response, including a positive response and a negative response, to the diagnostic device based on the result of processing the encoded data.

2. The vehicle control apparatus of claim 1, wherein the host core includes:
a security sub-layer for a security mode notification and a security data transmission response; and
an HSM driver configured to connect the security sub-layer with the HSM core.

3. The vehicle control apparatus of claim 1, wherein the HSM core is configured to perform a crypto algorithm to encode the data.

4. The vehicle control apparatus of claim 1, wherein the HSM core includes a security storage storing key information for encoding the data.

5. The vehicle control apparatus of claim 1, wherein the processor generates the first public key based on the first private key.

6. The vehicle control apparatus of claim 1, wherein the host core delivers a first internal command including second public key delivery, the security data transmission request, and a shared key generation request to the HSM core.

7. The vehicle control apparatus of claim 6, wherein the HSM core generates the shared key and delivers the first public key to the host core.

8. The vehicle control apparatus of claim 1, wherein the host core delivers a second internal command including a request to encode the data corresponding to an identification of the vehicle control apparatus and a request to provide the encoded data to the HSM core.

9. The vehicle control apparatus of claim 8, wherein the HSM core encodes the data based on the shared key and delivers the encoded data to the host core.

10. The vehicle control apparatus of claim 1, wherein the host core receives encoded data from the diagnostic device and delivers a third internal command including the encoded data and a data decoding request to the HSM core.

11. The vehicle control apparatus of claim 10, wherein the HSM core decodes the encoded data transmitted from the diagnostic device based on the shared key and delivers the decoded data to the host core.

12. The vehicle control apparatus of claim 11, wherein the host core processes the decoded data in an application and returns a response to the diagnostic device based on the result of processing the decoded data.

13. A vehicle control method, comprising:
generating a first private key and a first public key;
receiving a second public key from a diagnostic device;
generating a shared key based on the first private key and the second public key;
receiving a security data transmission request from the diagnostic device;
encoding data based on the shared key and transmitting the encoded data to the diagnostic device;
defining secured data transmission request service identification, data transmission type, and a record for a subsequent security data transmission request;
transmitting vehicle state data, including a vehicle information number, position information, event occurrence information, and a log record, necessary for diagnosis of the vehicle depending on the request of the diagnostic device; and
transmitting a response, including a positive response and a negative response, to the diagnostic device based on the result of processing the encoded data.

14. The vehicle control method of claim 13, wherein the generating of the shared key includes:
delivering, by a host core, a first internal command including second public key delivery, the security data transmission request, and a shared key generation request to an HSM core; and
generating, by the HSM core, the shared key and delivering, by the HSM core, the first public key to the host core.

15. The vehicle control method of claim 13, wherein the encoding of the data based on the shared key and the transmitting of the encoded data to the diagnostic device includes:
delivering, by a host core, a second internal command including a request to encode the data corresponding to an identification of a vehicle control apparatus and a request to provide the encoded data to an HSM core; and
encoding, by the HSM core, the data based on the shared key and delivering, by the HSM core, the encoded data to the host core.

16. The vehicle control method of claim 13, further comprising:
connecting a security sub-layer to an HSM core based on an HSM driver in response to receiving the security data transmission request from the diagnostic device; and
performing, by the security sub-layer, a security notification and a security data transmission response.

17. The vehicle control method of claim 13, wherein the encoding of the data based on the shared key and the transmitting of the encoded data to the diagnostic device includes:
encoding the data by executing a crypto algorithm by an HSM core.

18. The vehicle control method of claim 13, wherein the generating of the first private key and the first public key includes:
storing key information for encoding the data in a security storage of an HSM core.

19. The vehicle control method of claim 13, wherein the generating of the first private key and the first public key includes:
generating the first public key based on the first private key.

20. The vehicle control method of claim 13, further comprising:
receiving, by a host core, encoded data from the diagnostic device and delivering, by the host core, a third internal command including the encoded data from the diagnostic device and a data decoding request to an HSM core, after encoding the data based on the shared key and transmitting the encoded data to the diagnostic device;
decoding, by the HSM core, the encoded data based on the shared key and delivering, by the HSM core, the decoded data to the host core;
processing, by the host core, the decoded data in an application; and
returning, by the host core, a response to the diagnostic device based on the result of processing the decoded data.

* * * * *